United States Patent [19]
Streib et al.

[11] Patent Number: 5,413,540
[45] Date of Patent: May 9, 1995

[54] TORQUE-SETTING SYSTEM FOR VEHICLE WITH CONTINUOUSLY VARIABLE TRANSMISSION (CVT)

[75] Inventors: Martin Streib, Vaihingen/Enz; Rolf Leonhard, Schwieberdingen, both of Germany

[73] Assignee: Robert Bosch GmbH, Stuttgart, Germany

[21] Appl. No.: 86,612

[22] Filed: Jul. 2, 1993

[30] Foreign Application Priority Data

Jul. 21, 1992 [DE] Germany .................. 42 23 967.2

[51] Int. Cl.$^6$ ............... F16H 59/36; F16H 59/00; B60K 41/14
[52] U.S. Cl. ............................... 477/43; 477/46
[58] Field of Search ........................ 477/43, 46, 48

[56] References Cited

U.S. PATENT DOCUMENTS

| | | | |
|---|---|---|---|
| 4,653,006 | 3/1987 | Osanai et al. | 364/424.1 |
| 4,720,793 | 1/1988 | Watanabe et al. | 474/43 |
| 4,795,406 | 1/1989 | Dittrich et al. | 474/8 |
| 4,893,526 | 1/1990 | Tokoro et al. | 474/45 |
| 4,942,786 | 7/1990 | Dittrich et al. | 74/867 |
| 4,945,483 | 7/1990 | Tokoro et al. | 364/424.1 |
| 5,150,635 | 9/1992 | Minowa et al. | 477/43 |
| 5,157,609 | 10/1992 | Stehle et al. | 364/424.1 |
| 5,305,662 | 4/1994 | Togai et al. | 477/43 |

FOREIGN PATENT DOCUMENTS

| | | | |
|---|---|---|---|
| 4125574 | 2/1993 | European Pat. Off. | 525/419 |
| 3439882A | 5/1985 | Germany . | |
| WO92/09448 | 11/1992 | WIPO . | |

OTHER PUBLICATIONS

Robert Bosch GmbH, *Automotive Handbook*, 2nd English Edition, pp. 1-5 & 461-471, publ. by RB/KH/VDT, Stuttgart, Germany, 1986.

*Primary Examiner*—Dirk Wright
*Assistant Examiner*—Khoi Q. Ta
*Attorney, Agent, or Firm*—Frishauf, Holtz, Goodman & Woodward

[57] ABSTRACT

An apparatus for adjusting the output torque, or the output power, of a continuously variable transmission in vehicles propelled by combustion engines to a predetermined value, has a calculating unit (15) for setting a target value for the output torque or power M ab Soll as a function of an accelerator position (14;2) and vehicle speed (nab). An engine torque target value is calculated (units 18, 19, 20) as a function of the so value and an actual or instantaneous transmission ratio value or speed (u n ist). Target values of a transmission ratio are calculated in a unit (16), including a look-up table or an algorithm for storing or calculating transmission ratio values as a function of transmission output speed and of the accelerator pedal position (14;2) or the transmission output torque target value in accordance with a predeterminable engine operating strategy (e.g. optimum fuel efficiency, or performance, or driving comfort.

20 Claims, 1 Drawing Sheet

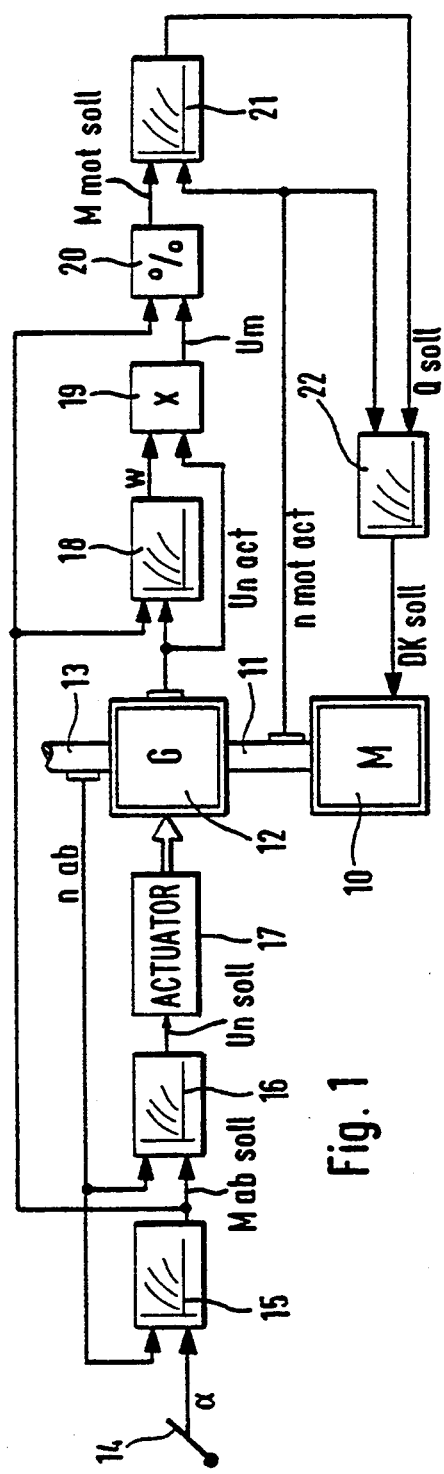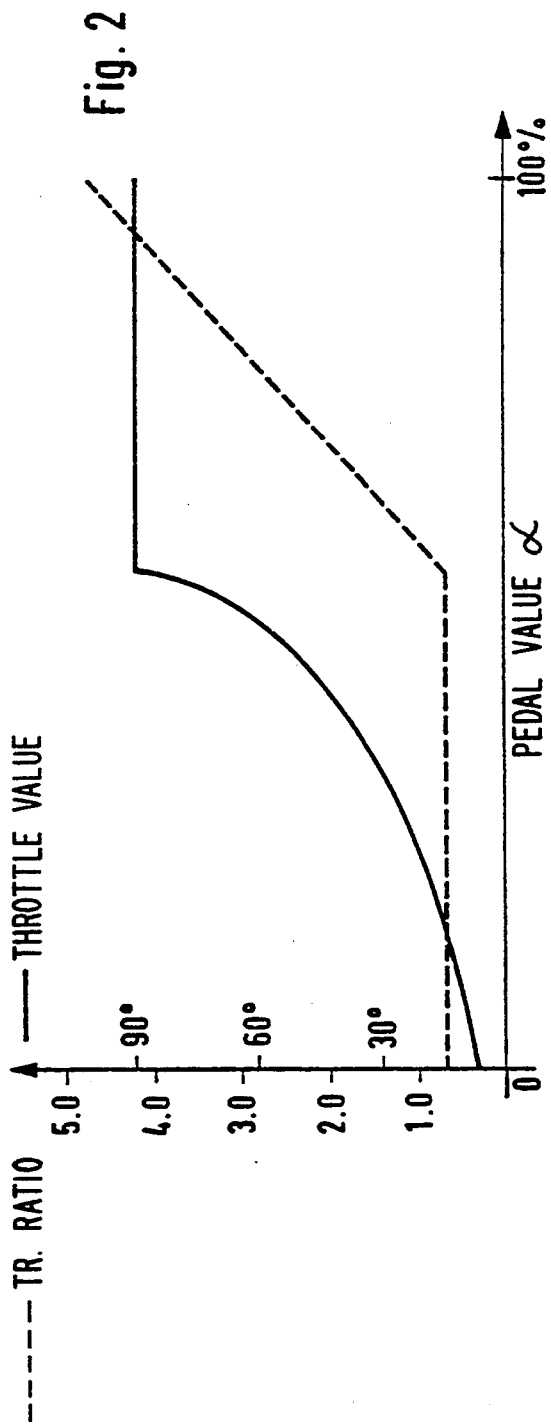

TORQUE-SETTING SYSTEM FOR VEHICLE WITH CONTINUOUSLY VARIABLE TRANSMISSION (CVT)

Reference to related patents, the disclosures of which are hereby incorporated by reference:
U.S. Pat. No. 4,795,406, Dittrich
U.S. Pat. No. 4,942,786, Dittrich
U.S. Pat. No. 5,157,609, Stehle et al.
Reference to related patent and other literature:
International Patent Publication WO 92/09448, Streib, based on PCT/DE 91/00818, U.S. designated, U.S. Ser. No. 08/050,085, filed Apr. 28, 1993, Streib, now abandoned.
Related literature:
Bosch Automotive Handbook, 2nd Eng. Ed., pages 461–471.

FIELD OF THE INVENTION

The invention relates to an apparatus for controlling the output power of a propulsion or drive unit of a vehicle and, more particularly, to an apparatus of the kind for adjusting the output torque or the output power of a continuously variable transmission of an automotive vehicle.

BACKGROUND

The traction, or propelling force, provided by the drive wheels of an automotive vehicle is determined by the torque at the output of a transmission (output torque) or by the output power of the transmission. The output torque is determined by two variables, viz.: the transmission ratio and the engine torque.

In the present context, the value of the transmission ratio is related to the value of the transmitted torque, it being understood that at a transmission efficiency below 1, the transmitted torque differs from the transmission ratio of the engine speed. The relevant engine torque is the torque generated by the engine minus the power consumed by accessory loads. A vehicle with a stepless i.e. continuously variable transmission (CVT) of the kind referred to, can provide an output torque defined on the basis of the traction desired by the driver of the vehicle by an infinite number of combinations of engine torques and transmission ratios.

It has been suggested to coordinate the transmission output torque directly, a pedal value, i.e. the position of the accelerator pedal; however, this results in excessive lost motion of the accelerator pedal and in poor control at high speeds. It is also known to derive a desired transmission output torque value from the position of the accelerator pedal and the engine speed. This, however, leads to an undesirable feedback when the transmission ratio is changed.

In vehicles equipped with continuously variable transmissions (CVT) and conventional throttle valve controls, where the throttle is regulated solely as a function of the accelerator pedal position, the transmission ratio is coordinated with the position of the accelerator pedal and, hence, of the throttle valve, in a manner which, results in a continuously increasing transmission, i.e. reduced transmission ratio, with increases in accelerator and throttle valve values. This improves driving performance, but the full benefits of a range of fuel efficiency at low transmission ratios and high engine torques cannot be realized.

THE INVENTION

In accordance with the invention, means are provided for operating a vehicle within the frame of a predetermined operational strategy, such as maximized fuel efficiency, independently of given accelerator pedal or throttle valve positions and engine revolutions, with a complete separation of throttle valve and transmission conditions.

Given the characteristics of conventional combustion engines, maximized fuel efficiency may in most cases be achieved by generating a given output torque with as high an engine torque as possible, and a low transmission ratio.

In accordance with the invention, this can easily be accomplished in a way which permits individual adaptability to different combustion engines. By means of the apparatus in accordance with the invention, excessive lost pedal motion, poor fuel apportioning properties at high speeds and undesirable feedback when the transmission ratio is changed, are effectively avoided. As an alternative to calculating the output torque "command" or target value as a function of accelerator position and vehicular speed, a desired output may be produced as a function of the accelerator position. In contrast to the calculation of an output torque target value, for obtaining acceptable driving properties, the speed of the vehicle need not necessarily be taken into consideration in the calculation of an output target value, thus resulting in simplification.

The predeterminable operating strategy for the combustion engine may advantageously provide either a "performance" driving mode or a fuel-efficient one. In a contemplated fuel-efficient driving mode, program curves or characteristic values derived empirically by measurements of fuel consumption during an installation phase, are stored as corrective or support guides in a look-up table or characteristic field, from which intermediate values may be arithmetically interpolated.

Thus, an optimum individual adaptation to a given combustion engine, ambient conditions and technical arrangements is easily possible. The program curves incorporate, of course, values relating to the engine speed transmission ratios of the transmission.

For practical purposes, the "command" or target value of the transmission ratio is selected, with due consideration given to minimum engine speed and the output torque desired by the driver, to be as low as possible. Particularly for purposes of adaptability to most conventional combustion engines, the transmission ratio stays at a minimum value up to an accelerator actuation (pedal depression) of about 50% and only thereafter increases, the increase being substantially linear. In the simplest situation, such a coarse setting, instead of an individualized application, may be utilized.

To avoid humming noises or other interferences with drivings comfort, in particular at high engine torque and low speed, certain program curves or characteristic field values may be calibrated for transmission ratios differing from those providing optimal fuel consumption.

For predetermining the target value of the transmission output torque, means are preferably provided for generating this target value as a function of the accelerator position and the driving speed. To produce optimum conditions, the means for generating the transmission output torque target value are preferably provided with a look-up table or characteristic field.

In case the degree of transmission efficiency, is significantly influenced by the torque and the engine speed, a transmission efficiency look-up table is advantageously provided for establishing the transmission ratio as a function of transmission output torque and/or of the transmission ratio of engine speed by the transmission. In this connection, means may be provided for calculating the torque transmission by multiplying the transmission ratio of engine revolutions with the transmission efficiency.

To optimize the quantity of the air-fuel mixture in each operating cycle, means are provided which establish this quantity on the basis of engine speed and the target value of the engine torque.

DRAWINGS

Embodiments of the invention are depicted in the drawings and are explained in detail in the following description. In the drawings:

FIG. 1 is a logic flow diagram of the electronic controls of a continuously variable transmission connected to an internal combustion engine; and FIG. 2 is a signal diagram for explaining the connection between the position of the accelerator and a transmission ratio or throttle value.

DETAILED DESCRIPTION OF THE PREFERRED EMBODIMENTS

The embodiment of FIG. 1 schematically depicts a combustion engine 10 of a vehicle (not shown) and a continuously variable transmission 12 connected therewith by a drive shaft 11. The vehicle is propelled in a manner not shown by wheels (not shown) operatively connected to the drive shaft 13.

Traction or driving speed, respectively, are set by an operator (not shown) by means of an accelerator pedal 14. The position a of the accelerator pedal 14 as well as the output speed of the transmission (n ab) measured at the vehicle drive shaft 13 and proportional to the driving speed, are input in a target value setting stage 15 for setting the transmission output torque target value (M ab soll). The target value may be set by an appropriate look-up table. Preferably, the transmission motion target value M ab soll is selected to as low a value as possible, consistent with minimum engine speed, at the selected transmission output torque target value. The target value setting stage 15 may be of the kind described in detail in German published patent specification and its corresponding p International application PCT/DE91/00818 WO 92/09448 on Jun. 11, 1992 U.S. designated. A target value for the speed transmission ratio Un SOLL is determined in a transmission ratio control stage 16 on the basis of the torque target value (M ab soll) and the output speed (n ab) of the transmission 12. For this purpose, there is provided within the transmission ratio control stage 16 a look-up table, the program curves of which contain engine speed transmission ratios as a function of output speed and output torque. To generate the look-up table, fuel consumption is measured under different combinations of engine torque and transmission ratios at predetermined reference points of output speed and output torque during the installation phase of the electronic control. The value determined to yield optimum fuel efficiency at a given transmission ratio will then be read into the corresponding reference point in the look-up table. In this manner, a look-up table for optimized consumption is generated for the transmission ratios. Values intermediate the individual reference points may thereafter be arrived at by arithmetic interpolation. The set target value (U n soll) then controls an actuator 17, which is usually electro-hydraulic, to set the transmission ratio of engine speed in the transmission 12.

The resultant actual value (u n act) of the speed transmission ratio of the transmission 12 is then input to an output value determination stage 18, together with value (M ab soll), where the transmission efficiency value w is determined on the basis of these variables, by a look-up table, for instance. The output value w is thereafter multiplied in a multiplication stage 19 by the actual value of the speed transmission ratio (U n), to determine the torque transmission ratio (U m) (i.e. the torque ratio of output and input). Provided the transmission efficiency is not significantly influenced by torque and engine speed, the output value determination stage 18 may, of course, be omitted. Furthermore, at a ratio close to 1 or in a simpler embodiment, the multiplication stage 19 may be omitted as well. By dividing the output torque target value (M ab soil) by the torque ratio (U m) the target value of the torque at the input of the transmission 12 is determined, that is to say, the engine torque target value (M mot soll) which is identical to the torque target value at the transmission input, if the drive connection between engine and transmission is a stiff one. If a torque converter is provided, a converter amplification will have to be taken into consideration. This has been described in more detail in German patent specification DE 41 25 574 A, for instance.

The combustion engine 10 now has to generate a certain engine torque conforming to the engine torque target value (M mot soll). Modes of accomplishing this have been described in the documents referred to supra. A simple method is depicted in FIG. 1. In a look-up table control stage 21, from a program curve specific to the engine, a target value (Q soll) is calculated for the quantity of fuel-air mixture intake for each operational cycle of the combustion engine, on the basis of engine speed (n mot), i.e. the speed of the drive shaft 11, and the engine torque target value (M mot soll). In a further motor control stage 22, having from a program curve specific to the engine, a throttle target value DK is then calculated on the basis of the intake target value in connection with the engine speed (n mot act). The throttle target value DK is then translated into a corresponding position by means of an electronically controlled throttle actuator ("electronic gas pedal"). The two look-up tables of the look-up table control stage 21 and of the engine control stage 22 may be combined into a single look-up table, by making the throttle target value DK a function of engine speed (n mot act) and engine torque (M mot soll). This would result in reduced calculation time and memory space, but adjustments, such as air pressure adjustments, would be more difficult.

In fuel-injected engines, target values for injected fuel quantities may, of course, be controlled alternatively or additionally by a look-up table as a function of the engine torque target value and engine speed. This is also true in respect of diesel engines in which engine torque is controlled in connection with appropriate actuators (EDC) by appropriately determining the target values for injection quantities.

In the diagram depicted in FIG. 2, there is shown a condition which is typical of conventional combustion engines in which in most cases the most advantageous fuel efficiency is attained by generating a certain output torque at as high an engine torque as possible and a low transmission ratio. The corresponding look-up table in the transmission control stage 16 will, in such cases, provide a combination of transmission ratios and throttle positions as is quantitatively shown in FIG. 2: As the output torque demand increases, a very low transmission ratio will initially remain unchanged, whereas the throttle will open close to 100%. After the accelerator pedal has been depressed by about 50%, a further increase in output torque demand can no longer be accommodated by further opening of the throttle, but only by an increase in the transmission ratio. For this reason, commencing at this point, the position of the transmission will increase substantially linearly, until a maximum value has been reached.

At high engine torques and low engine speeds humming noise and other factors which detrimentally affect driving comfort, may be generated by the combustion engine 10 or by the transmission 12. To avoid them, the transmission target value look-up table in the transmission control stage 16 may be modified to set a transmission ratio which differs from the one yielding optimum fuel consumption. For the sake of comfort, it is possible, therefore, in certain critical ranges, to deviate from the consumption optimizing transmission setting.

Instead of a transmission setting providing for optimum fuel consumption as described in the embodiments, another operating strategy may, of course, be selected for the combustion engine, such as a sport or performance driving mode which is dependent on different transmission values. These may also be stored in a theoretically or empirically derived look-up table.

Instead of setting the transmission ratio on the basis of look-up tables, any given transmission may, of course, also be calculated on the basis of an appropriate algorithm. The calculations for required transmission ratios may be carried out by calculators or microprocessors provided in the system. A number of conventional microprocessors, e.g. INTEL(Reg. TM ), are suitable.

Instead of calculating or setting the transmission ratio as a function of accelerator pedal position and vehicle speed, as in the described embodiment, power, as a function of accelerator position, can be used as a target factor. To then provide acceptable driving properties, speed need not necessarily be taken into consideration in calculating an output target value, which would result in simpler circumstances.

Various changes and modifications are possible within the scope of the inventive concept. In particular, features of one embodiment may be combined with features of another embodiment.

What is claimed is:

1. An apparatus for adjusting the output characteristics of a continuously variable transmission of a vehicle provided with a combustion engine, to a predetermined value, comprising:
   accelerator means (14);
   means (15) for determining a transmission output torque target value (M ab soll) as a function of the position ($\alpha$) of said accelerator means (14);
   means (18, 19, 20) for calculating an engine torque target value (M mot soll) as a function of said transmission output torque target value (M ab soll) and an instantaneous, actual transmission ratio (U n act);
   wherein said engine torque target value (M mot soll) calculating means is connected to and controls the combustion engine (M); and
   means (16) for calculating a transmission ratio target value (U n soll) as a function of transmission output speed (n ab) and one of
   the position ($\alpha$) of said accelerator means and
   said transmission output torque target value (M ab soll)
   on the basis of stored values relating transmission output speed (nab) to transmission output torque target value (M ab soll), and
   wherein said transmission ratio target value calculating means (16) is connected to and controls the transmission ratio of said transmission (G) and receives an input from at least one of
   said accelerator means (14) and
   said transmission output torque target value (M ab soll) determining means (15).

2. The apparatus of claim 1, wherein said transmission output torque target value (M ab soll) determining means (15) are connected to and receive a signal representative of transmission output speed (nab) and additionally determines the transmission output torque target value (M ab soll) also as a function of said speed.

3. The apparatus of claim 1, wherein said means (16) for calculating said transmission ratio target value includes a look-up table means relating transmission output speed (n ab) to output torque target value (M ab soll).

4. The apparatus of claim 1, wherein said stored values are stored in the form of program curves based on said transmission output speed (nab) and one of said accelerator means positioned (14, $\alpha$) and said transmission output torque target value (M ab soll).

5. The apparatus of claim 4, wherein said program curves are based on empirically established data determining fuel consumption based on tests.

6. The apparatus of claim 1, wherein said means (16) for calculating said transmission ratio target value includes algorithm means for calculating said transmission ratio target value (M ab soll).

7. The apparatus of claim 1, wherein said stored values in said means (16) for calculating said transmission ratio target value (M ab soll) are separated between values representative of different operating strategies for said vehicle; and
   wherein said operating strategies comprise one of:
   a fuel-efficient driving mode,
   a performance driving mode,
   a comfort driving mode.

8. The apparatus of claim 7, wherein the stored values of said "comfort" operating strategy include values which result in a fuel inefficient driving mode.

9. The apparatus of claim 1, wherein said stored values store characteristics of said combustion engine, including engine minimum speed data; and
   wherein the stored data relate the transmission ratio target value (U n soll) to transmission output torque target value (M ab soll) as a function of the position ($\alpha$) of said accelerated means (14) as selected by the operator of the vehicle, to provide for lowest transmission ratio consistent with said minimum engine speed.

10. The apparatus of claim 9, wherein said stored values control the transmission ratio target value calculating means (16) to maintain the transmission ratio essentially constant until the accelerator means (14) has reached up to about 50% of a maximum control range thereof, and the transmission ratio is controlled to rise only after the accelerator means exceeds 50% of the range.

11. The apparatus of claim 10, wherein said ratio changes essentially linearly after the accelerator position exceeds a deflection of over 50% of its maximum deflected position.

12. The apparatus of claim 1, further including electrohydraulic actuator means (17) coupled to and controlled by said transmission ratio target value calculating means (16) and actuating said transmission (G).

13. The apparatus of claim 1, wherein said engine torque target value (M mot soll) calculating means (18, 19, 20) includes a look-up table means (18) relating the efficiency of torque transmission of said transmission (G) to at least one of
 transmission output torque (M ab soll) and
 actual transmission speed ratio (U n act).

14. The apparatus of claim 13, wherein the look-up table means (18) relates the efficiency of torque transmission of said transmission (G) to both transmission output torque (M ab soll) and actual transmission speed ratio (U n act).

15. The apparatus of claim 13, wherein said engine torque target value (M mot soll) calculating means (18, 19, 20) includes means (19) receiving an output from said look-up table means (18) and providing an output (M mot soll) by multiplying the transmission ratio of engine speed (U n act) with a signal representative of transmission efficiency (w).

16. The apparatus of claim 1, wherein said engine torque target value (M mot soll) calculating means (18, 19, 20) further comprises look-up table means (21) relating the quantity of air-fuel mixture for each operating cycle of the engine to actual engine speed (n mot act) and the calculated engine torque target value (M mot soll), said look-up table means being connected to and controlling the supply of air-fuel mixture to the engine.

17. In a motor vehicle having a combustion engine (M), a continuously variable transmission (G) coupled to the engine, and an operator selectively variable engine control means (14),
 a system to calculate a target transmission output torque, by controlling said engine (M) and the transmission ratio of said transmission (G) based on an operator selected position (α) of the engine control means (14) for a desired output torque, said system comprising
 first calculating means (15) receiving an input signal from the engine control means (14), and a signal representative of transmission output speed (n ab) and calculating a target transmission output torque (M ab soll);
 second calculating means (16) including a look-up table means storing the relationship of transmission ratio as a function of transmission output speed (n ab) and one of the position (α) of the engine control means (14) and the target transmission torque (M ab soll),
 wherein said look-up table has a plurality of storage subtables which differ in vehicle operating characteristics with respect to at least one of: fuel efficiency, performance, and driving comfort;
 said second calculating means being connected to and controlling the transmission (G) to set the transmission ratio (U n soll) to a transmission ratio target value; and
 third calculating means (18-20) coupled and connected to the engine (M) and controlling the engine torque (M mot soll) based on:
 (a) calculated transmission target torque (M ab soll) derived from said first calculating means (15), and
 (b) actual transmission ratio (U n act) derived from the transmission (G) to thereby determine the output torque applied to the vehicle by the transmission to be equal to the target output torque (M ab soll), as controlled by the operator operating the control means (14).

18. The system of claim 17, wherein said stored values store characteristics of said combustion engine, including engine minimum speed data; and
 wherein the stored data relate the transmission ratio target value (U n soll) to transmission output torque target value (M ab soll) as a function of the position (α) of said accelerated means (14) as selected by the operator of the vehicle, to provide for lowest transmission ratio consistent with said minimum engine speed.

19. The system of claim 17, wherein said stored values control the transmission ratio target value calculating means (16) to maintain the transmission ratio essentially constant until the accelerator means (14) has reached up to about 50% of a maximum control range thereof, and the transmission ratio is controlled to rise only after the accelerator means exceeds 50% of the range.

20. The system of claims 17, wherein said engine torque target value (M mot soll) calculating means (18, 19, 20) includes a look-up table means (18) relating the efficiency of torque transmission of said transmission (G) to at least one of
 transmission output torque (M ab soll) and
 actual transmission speed ratio (U n act).

* * * * *